United States Patent
Simmons

[11] Patent Number: 6,102,384
[45] Date of Patent: Aug. 15, 2000

[54] NOZZLE SETTING JIG

[76] Inventor: Charles W. Simmons, P.O. Box 5485, Pasadena, Tex. 77508

[21] Appl. No.: 09/307,828

[22] Filed: May 7, 1999

[51] Int. Cl.[7] ........................................................ B25B 1/20
[52] U.S. Cl. ................................................ 269/37; 269/41
[58] Field of Search ......................................... 269/37, 41

[56] References Cited

U.S. PATENT DOCUMENTS

| | | | |
|---|---|---|---|
| 3,966,528 | 6/1976 | Christie | 269/37 |
| 4,445,677 | 5/1984 | Hansen et al. | 269/41 |
| 4,533,424 | 8/1985 | McElroy | 269/41 |
| 4,611,743 | 9/1986 | Williams | 269/41 |
| 5,040,716 | 8/1991 | Stetz . | |
| 5,312,096 | 5/1994 | Jasper . | |

Primary Examiner—David A. Scherbel
Assistant Examiner—Daniel G. Shanley
Attorney, Agent, or Firm—Michael B. Jolly

[57] ABSTRACT

A nozzle setting jig useful for aligning and holding a nozzle in proper orientation in an upwardly positioned opening in a sidewall of a pipe or round vessel for welding the nozzle thereto. The jig is useful for use with standard nozzles which nozzles include a short cylindrical section with a flange attached to one end while the other end is contoured cut to coincide with the curvature of a sidewall of a pipe or vessel to which the nozzle will be attached. The nozzle setting jig includes a nozzle flange mounting plate with two length adjustably legs which are self centering and which are adaptable for use with numerous size nozzles. The jig allows a welder to set the proper depth of the nozzle within the opening in the pipe or vessel while also aligning the heavy nozzle both laterally and archingly in relation to the longitudinal axis of the pipe or vessel to which the nozzle will be attached.

2 Claims, 5 Drawing Sheets

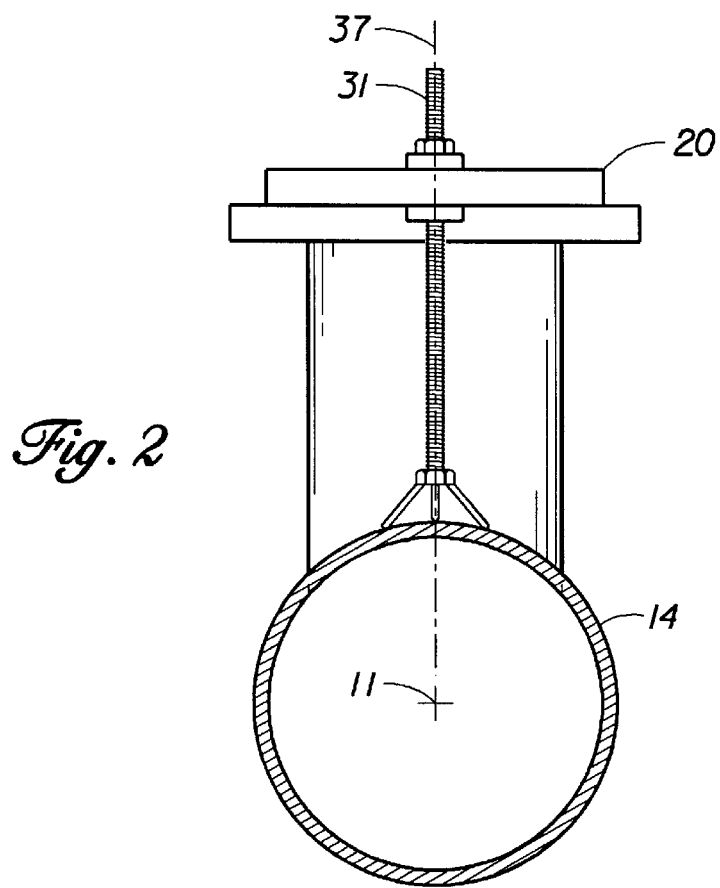
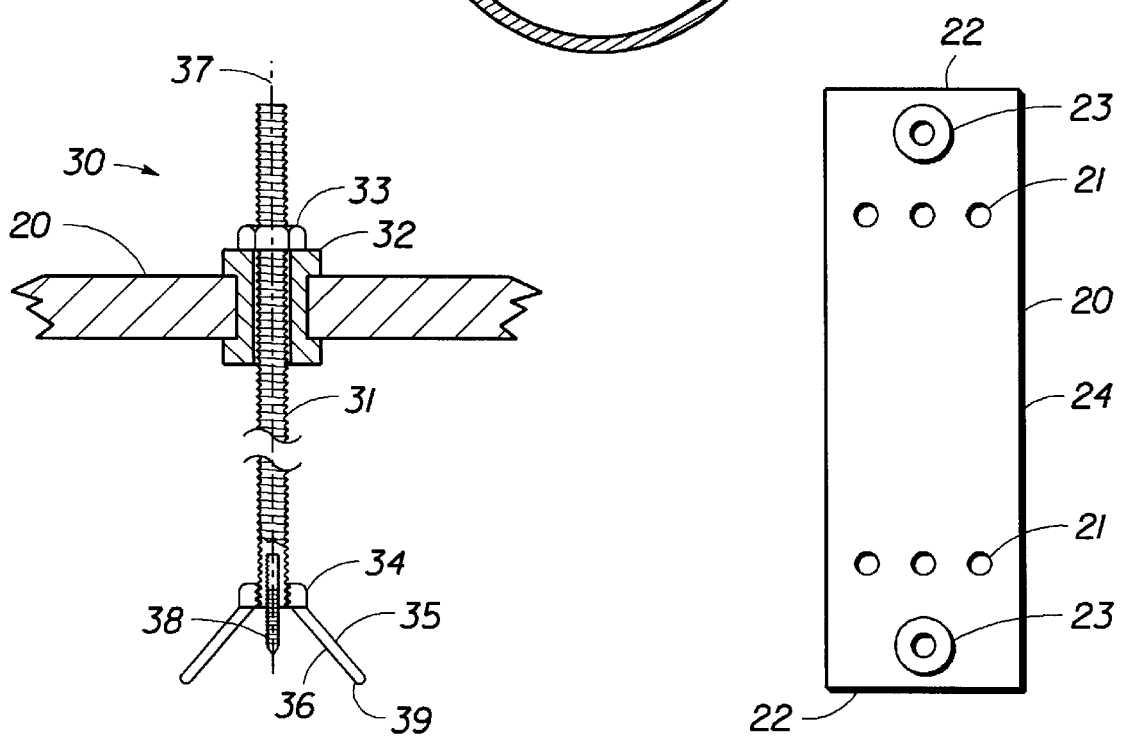

NOZZLE SETTING JIG

TECHNICAL FIELD

The present invention relates to a jig for setting a nozzle and more particularly to a jig that sets and holds a nozzle in proper alignment over an opening in the side of a round vessel or pipe thereby allowing the nozzle to be welded in place.

BACKGROUND ART

Welding a nozzle to an opening in the side of a round vessel or pipe requires a welder to hold the nozzle in proper orientation and depth within the opening while simultaneously tach welding the nozzle in place. Industry standard nozzles are provided in standard diameters and lengths and include a flange attached to one end, while the other end is contoured cut to match the curvature of the sidewall of a vessel or pipe that the nozzle will be welded to. The particular alignment of the nozzle in orientation with the vessel or pipe depends on the specifications of the particular plumbing or vessel to be fabricated. Normally, the longitudinal axis of the nozzle will be aligned perpendicularly in relation to the longitudinal axis of the subject vessel or pipe while the longitudinal axis of the nozzle may also be aligned radially along the longitudinal axis of the subject vessel to coincide with the opening where the nozzle will be welded.

A problem in the fabricating industry and for pipe fitters, is the difficulty encountered when attempting to weld a nozzle on a pipe or vessel while also holding the nozzle in alignment with the subject vessel or pipe. Normally, the pipe or vessel is positioned horizontally so that the longitudinal axis of the nozzle to be welded in place is vertical above the opening in the sidewall of the vessel or pipe. In this position the nozzle, under the influence of gravity, will fall directly through the opening in the sidewall of the vessel or pipe. Accordingly, the welder must support the nozzle a proper depth in the opening while also aligning the nozzle in proper orientation both radially and archingly in relation with the longitudinal axis of the vessel or pipe. The present invention is bolted directly to the flange of the standard nozzle, and includes two extendable and adjustable legs that align and support the nozzle over the opening while welding.

Prior to the present invention there has never been a jig which is specially adapted for aligning nozzles to be welded in place on an outside of a pipe and/or round vessel. Jigs for welding pipe to pipe have been patented however, these prior inventions are not adaptable for use with nozzles and furthermore are not adaptable for vessels. The prior art patents include Jasper, U.S. Pat. No. 5,312,096 and Stefz, U.S. Pat. No. 5,040,716.

The present invention is easily adapted for use with numerous size nozzles and includes a nozzle flange support plate with two extendable support legs which support the nozzle in adjustable relationship with the longitudinal axis of the subject pipe or vessel and in a desired depth in the opening in the vessel or pipe. The present invention is adaptable for numerous size nozzles, nozzles with different size flanges and also adaptable for use on pipes and vessels of various diameters. Furthermore the present jig may also be used to support and align a nozzle for welding on flat material if necessary.

GENERAL SUMMARY DISCUSSION OF INVENTION

It is thus an object of the invention to provide a jig for aligning and supporting a nozzle to be welded to a side wall opening in a pipe or round vessel.

It is a further object of the invention to provide an easy to use jig which is adaptable for welding a nozzle to a pipe or vessel, wherein the nozzle includes a cylindrical section with a flange attached to one end while the other end is contoured cut to coincide with the curvature of a sidewall of a vessel or pipe to be attached, an opening is provided through the sidewall of the pipe or vessel to which the nozzle will be attached, the jig supports the nozzle at a preferred depth within the opening and at a preferred alignment both radially and archingly in relation to the longitudinal axis of the pipe or vessel.

It is a still further object of the invention to provide a nozzle setting jig for aligning and supporting a nozzle for attachment to a sidewall of a pipe or vessel, wherein the nozzle includes a cylindrical section with a flange attached to one end while the other end of the cylindrical section is contoured cut to coincide with the curvature of the sidewall of a pipe or vessel, the jig includes a nozzle flange plate that is bolted to the flanged end of the nozzle while two extendable and adjustable support legs extend from each end of the support plate on opposing sides of the nozzle cylindrical section and parallel with the longitudinal axis of the cylindrical section of the nozzle. Each extendable support leg includes a centering and leveling means for adjusting both the height of the nozzle within the opening of the vessel or pipe and arching position of the nozzle in relation to the longitudinal axis of the subject vessel or pipe thereby providing a means for aligning the nozzle in position for welding to a pipe and/or round vessel.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is an end view of the nozzle setting jig with a nozzle attached in place and positioned over an opening through the sidewall of a round pipe and/or round vessel illustrating the leveling members of the support legs.

FIG. 3 is a cross sectional view of an extendable support leg taken along line A in FIG. 1 end which details the centering and leveling mechanism provided at one end of the jig.

FIG. 4 is a top view of the nozzle flange support plate illustrating the positioning of the flange mounting hole and leveling member holes.

EXEMPLARY MODE FOR CARRYING OUT THE INVENTION

Figure 5A:
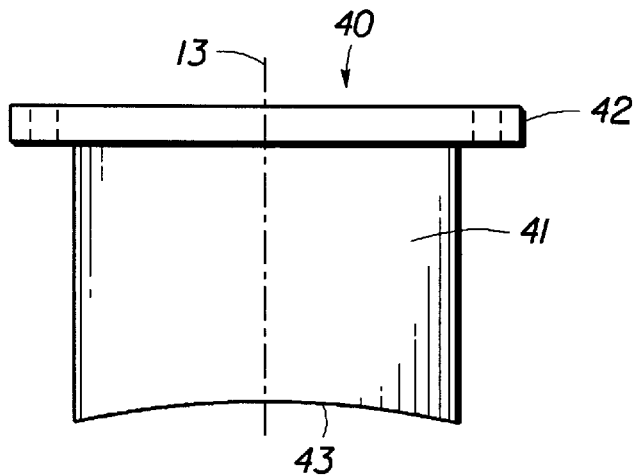
FIG. 5a is a side view of a typical nozzle illustrating a short cylindrical section while one end is contour cut to coincide with the curvature of a sidewall of a vessel and/or pipe with a flange attached to the top end.
Figure 5B:
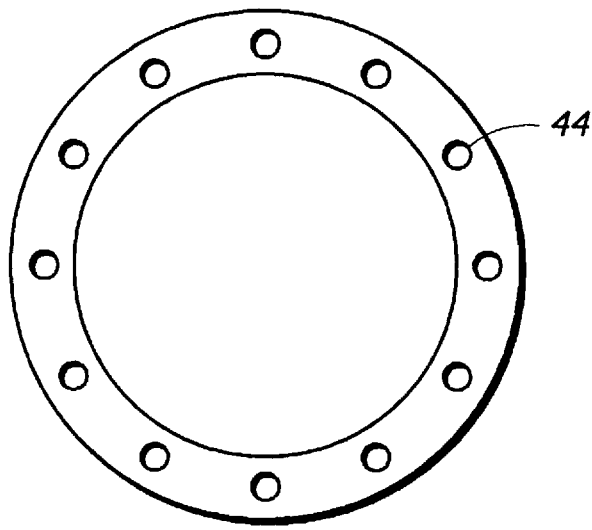
FIG. 5b is an end view of the flange end of a typical nozzle.
Figure 5C:
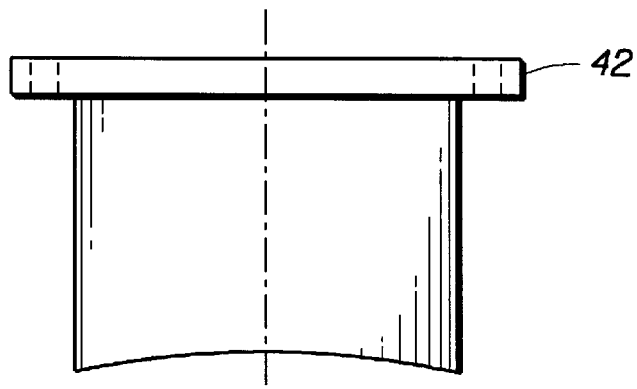
FIG. 5c is another side view of a typical nozzle of FIG. 5a which has been rotated 90° about axis B.
Figure 6A:
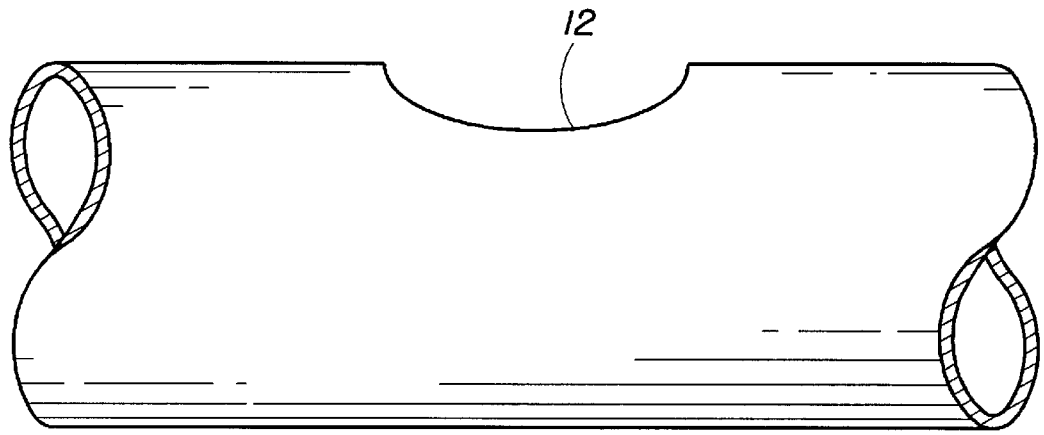
FIG. 6a is a side view of a pipe or round vessel illustrating an opening hole through a side wall and wherein the opening is positioned upwardly ready for placement of a nozzle and the jig.
Figure 6B:
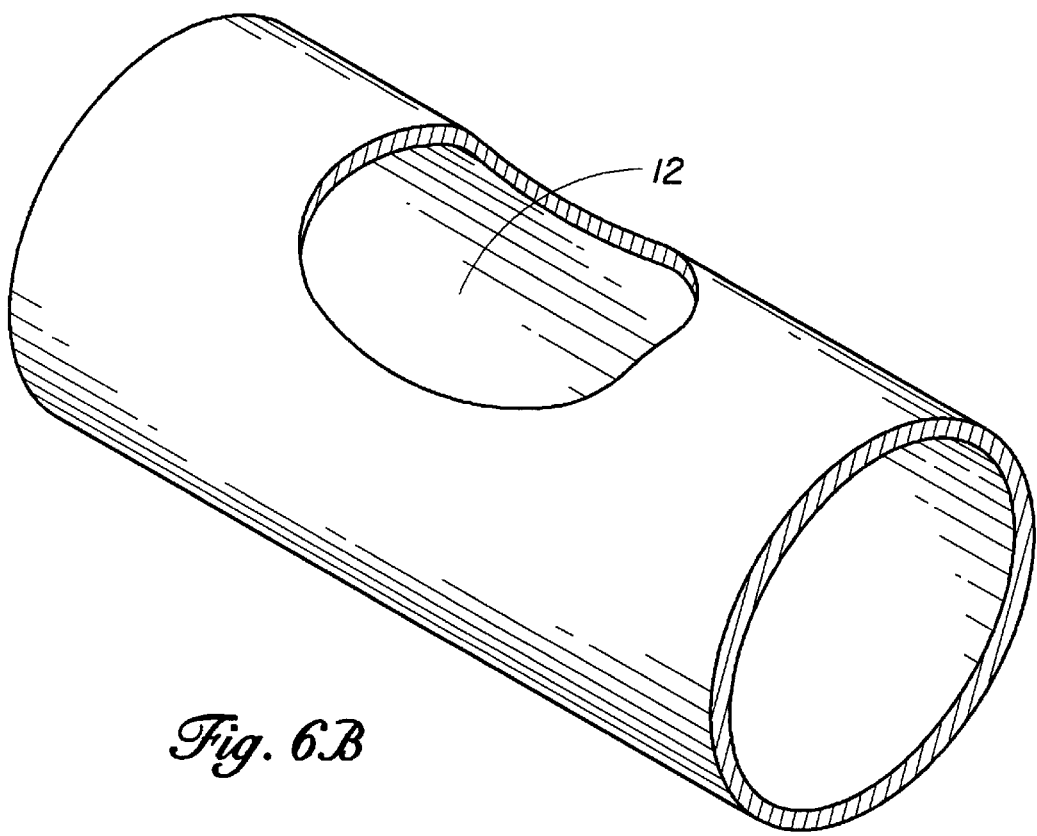
FIG. 6b is an isometric view of FIG. 6a and illustrating the "saddle like" shape of the opening through the round vessel and/or pipe for attaching the nozzle.

It can be seen from the preceding description that the nozzle setting jig is useful for supporting and aligning a standard nozzle in proper orientation on an outside wall of a pipe or round vessel for welding the nozzle thereon. The nozzle setting jig is also useful for holding the nozzle within a proper depth of an opening through a side wall of a pipe or round vessel for attachment. The jig 10 is useful with standard nozzles 40, a typical illustration is depicted in FIGS. 5a through 5c, which includes a short cylindrical section 41 with a flange 42 attached to one end of the cylindrical section. The other end of the cylindrical section includes a contoured cut 43 which coincides with the curvature of an outside wall of a subject pipe and/or round vessel to which the nozzle will be attached. FIG. 5b is an end view of the flange end of the nozzle which includes numerous holes 44 which are used in the industry for attaching pipes to the nozzle. The bolt holes 44 are used by the present invention for mounting the nozzle to the jig as will be shown below. FIG. 5a illustrates the upward curved section of the contoured end of the cylindrical section while FIG. 5c illustrates the downward curved section of the contoured end. FIG. 5a is rotated ninety degrees about axis 13 to depict FIG. 5c.

FIGS. 4 and 3 illustrate detail components of the jig. The jig includes a planar flange plate 20, a top view is illustrated in FIG. 4. The jig also includes two extendable support legs 30, a longitudinal cross section of which is illustrated in FIG. 3. The planar flange plate 20 is rectangular in shape and the length of which is dependant upon the size of nozzle flange to be mounted thereto. Numerous nozzle flange mounting bolt holes 21 are positioned near opposing ends 22 of the flange plate 20 for bolting the nozzle flange thereto. Two extendable support leg mounting apertures 23 are positioned on opposing ends 22 of the planar flange plate. The mounting apertures 23 center point is an alignment with a center point of a nozzle flange 13 that is mounted to the flange plate 20. The flange plate includes a flat flange mounting surface 24 on one side of the flange plate and to which the nozzle flange is mounted. Bolts 25 secure the nozzle flange to the flat flange mounting surface of the flange plate.

The extendable legs 30 are preferably constructed of threaded rod material 31 and extend through a rotating adjustment means 32 which includes a threaded aperture through which the threaded rod material is extended. The rotating adjustment means 32 is captured within apertures 23. Alternatively the rotating adjustment means may include a noncaptured adjustment means or simply two nuts positioned on either side of the planar flange plate 20. The extendable legs extend perpendicularly to the flat flange mounting surface 24 of the flange plate 20. Since the extendable legs are positioned on either end of the flange plate 20 the extendable legs thereby support the flange plate at a desired height depending upon the adjustment made to each leg as desired. Normally, after the nozzle flange has been secured to the flange plate 20 the nozzle along with the jig is set upon a side wall of a pipe or a round vessel and the nozzle is positioned over a location to which it will be attached thereto. The round vessel and/or pipe is preferably positioned so that the longitudinal axis 11 of the subject pipe and/or vessel is positioned horizontally while the attachment location 12 is facing upward so that the jig and nozzle may be easily placed for welding the nozzle thereto. Length adjustment of the support legs allows a user to selectively adjust the alignment of the longitudinal axis of the nozzle 13 in alignment with the longitudinal axis 11 of the subject pipe and/or round vessel. Length adjustment of the extendable members also allows a user to selectively support the contoured end of a nozzle at a desired depth within an opening through the side wall of the subject pipe and/or vessel.

The extendable support legs 30 include a centering means 35 positioned on a support end 34 of the extendable legs 31. The centering means includes an inverted "V" member 36 whereby the legs of the inverted "V" originate from a central longitudinal axis 37 of the leg. A captured spring center punch 38 extends centrally from a supporting end 34 and extends to a length of about equal to the ends 39 of the legs of the "V" member 36. The centering means 35 assures that when the support end of the extendable members is rested upon an outer surface 14 of a subject pipe and/or round vessel the longitudinal axis 37 of the support member 31 will intercept with a center point 11 of a subject pipe and/or round vessel. This centering means aligns the longitudinal axis 13 of the nozzle with the longitudinal axis 11 of the subject pipe and/or round vessel.

Figure 1:
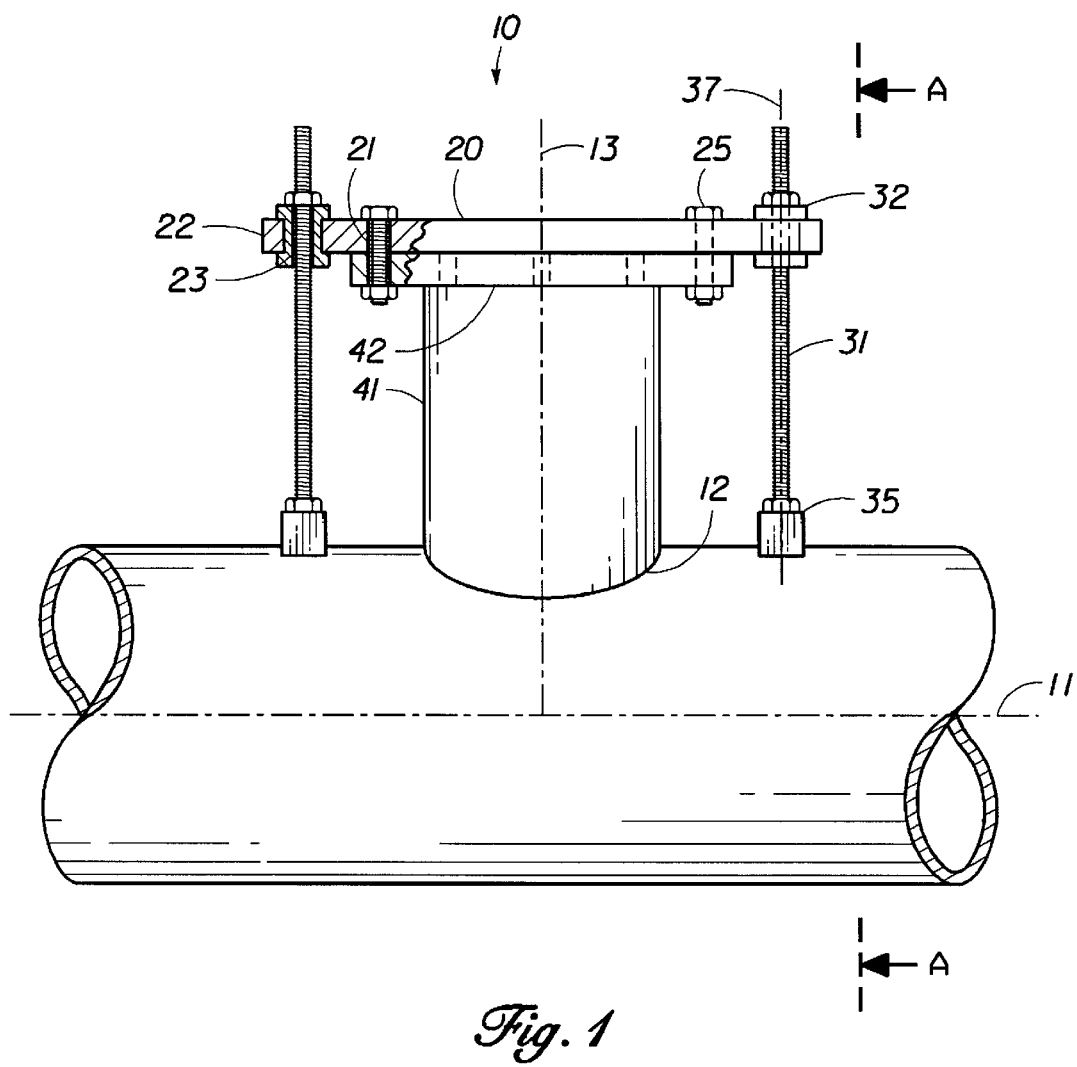
FIG. 1 is a side view of the nozzle setting jig with a nozzle mounted thereto and wherein the nozzle setting jig along with the nozzle are set in alignment above an opening in a sidewall of a round pipe or vessel and ready for welding.
Figure 1A:
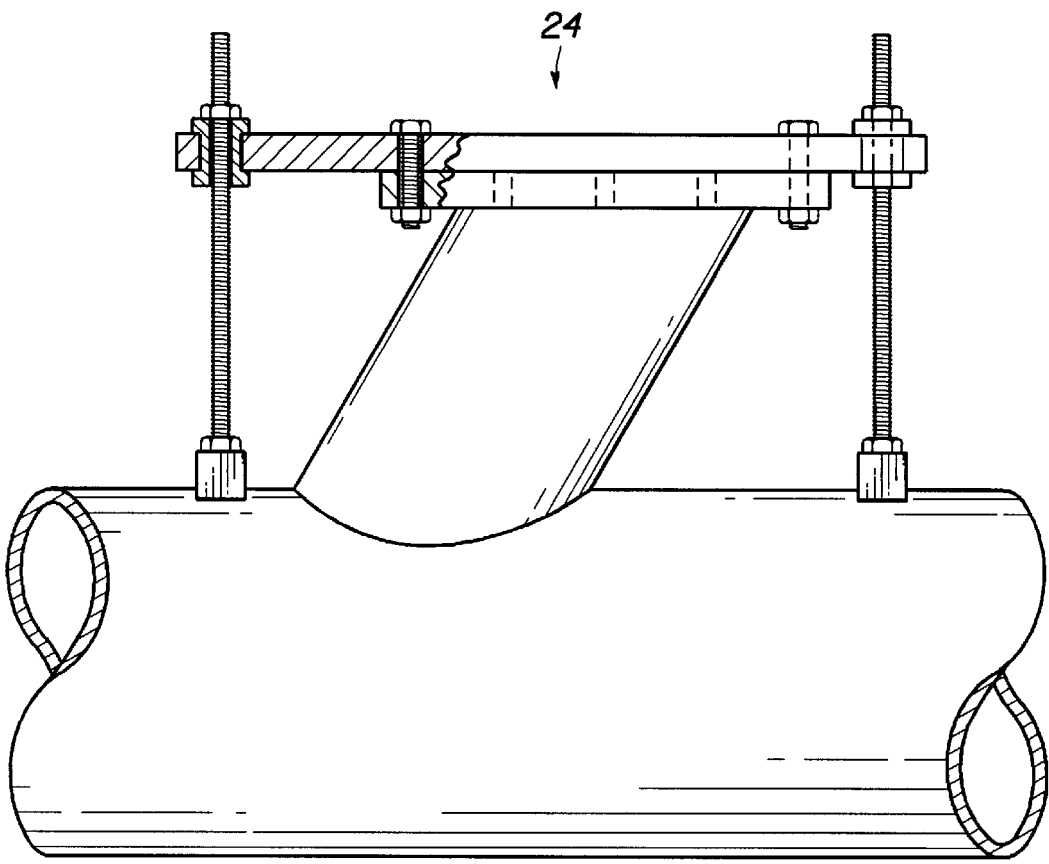
FIG. 1a is a side view of the nozzle setting jig with a nozzle mounted thereto and wherein the nozzle setting jig along with an angled nozzle are set in angled alignment above an opening in a sidewall of a round pipe or vessel and ready for welding.

FIG. 1a illustrates an alternative version of the nozzle setting jig with the nozzle flange bolt holes offset to accommodate an angled nozzle. As can be seen from the illustrations both depth of the nozzle within an opening and alignment of the longitudinal axis of the nozzle with the longitudinal axis of the subject pipe and/or vessel is achieved similarly.

It is noted that the embodiment of the nozzle setting jig as described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

I claim:

1. A nozzle setting jig useful for holding and aligning a nozzle to be welded to a sidewall of a pipe or round vessel wherein the nozzle includes a cylindrical pipe section with a flange attached to one end while the other end of the cylindrical section is contour cut to coincide with the curvature of the sidewall of the pipe or round vessel to which the nozzle will be attached, while using the jig the pipe or round vessel is positioned with a longitudinal axis horizontal with the attachment location on the sidewall facing upward, the nozzle setting jig comprises;

a) a rectangular planar nozzle flange plate with a flat flange mounting surface positioned on one side of the flange plate, multiple flange mounting holes positioned near ends of the plate and positioned to align with bolt holes through the flange on the nozzle and providing mounting holes for bolting the nozzle flange to the plate, b) two length extendable support legs each mounted to opposing ends of the planar flange plate and each extending perpendicularly from the flat flange mounting surface thereby extending parallel and on opposing sides of a cylindrical section of a nozzle bolted to the flange plate, a centering means attached to a support end of each leg which aligns a longitudinal axis of each leg with a longitudinal axis of the pipe or round vessel when the support end of the support legs are positioned on an outer surface of a sidewall of the pipe or round vessel, the length extendable support legs further comprise; threaded rod members mounted through mounting apertures positioned on opposing ends of the planar flange plate, a center point of the mounting apertures are in alignment with a center point of an end view of a cylindrical nozzle attached to the planar flange plate, a rotating rod length adjustment means captured within each mounting aperture wherein the adjustment means includes a threaded aperture through which a threaded rod member extends and a length of rod member extending from the flat flange mounting surface is adjusted by rotating the adjustment means, a rod length adjustment locking means.

2. A nozzle setting jig useful for holding and aligning a nozzle to be welded to a sidewall of a pipe or round vessel wherein the nozzle includes a cylindrical pipe section with a flange attached to one end while the other end of the cylindrical section is contour cut to coincide with the curvature of the sidewall of the pipe or round vessel to which the nozzle will be attached, while using the jig the pipe or round vessel is positioned with a longitudinal axis horizontal with the attachment location on the sidewall facing upward, the nozzle setting jig comprises;

a) a rectangular planar nozzle flange plate with a flat flange mounting surface positioned on one side of the flange plate, multiple flange mounting holes positioned near ends of the plate and positioned to align with bolt holes through the flange on the nozzle and providing mounting holes for bolting the nozzle flange to the plate, b) two length extendable support legs each mounted to opposing ends of the planar flange plate and each extending perpendicularly from the flat flange mounting surface thereby extending parallel and on opposing sides of a cylindrical section of a nozzle bolted to the flange plate, a centering means attached to a support end of each leg which aligns a longitudinal axis of each leg with a longitudinal axis of the pipe or round vessel when the support end of the support legs are positioned on an outer surface of a sidewall of the pipe or round vessel, wherein the centering means further comprises; an inverted V member attached to a supporting end of each support leg with legs of the V extending from a centerpoint of the supporting end, a spring extendable center punch extending centrally from the centerpoint of the supporting end and springingly extending to a position about equal to an end of each leg of the V member.

* * * * *